United States Patent
Hagiwara et al.

(10) Patent No.: US 11,003,404 B2
(45) Date of Patent: May 11, 2021

(54) INFORMATION PROCESSING APPARATUS, INFORMATION PROCESSING METHOD AND NON-TRANSITORY RECORDING MEDIUM

(71) Applicant: TOSHIBA TEC KABUSHIKI KAISHA, Tokyo (JP)

(72) Inventors: Takahiro Hagiwara, Chiba Chiba (JP); Hiroshi Watanabe, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/577,131

(22) Filed: Sep. 20, 2019

(65) Prior Publication Data

US 2021/0089252 A1 Mar. 25, 2021

(51) Int. Cl.
*G06F 3/12* (2006.01)

(52) U.S. Cl.
CPC .......... *G06F 3/1238* (2013.01); *G06F 3/1222* (2013.01); *G06F 3/1292* (2013.01)

(58) Field of Classification Search
CPC ..... G06F 3/1238; G06F 3/1222; G06F 3/1292
USPC ........................................................ 358/1.14
See application file for complete search history.

(56) References Cited

U.S. PATENT DOCUMENTS

| 7,891,294 B2 * | 2/2011 | Yamamoto | B41F 13/46 101/211 |
| 8,279,474 B2 | 10/2012 | Miyamoto | |
| 2012/0123675 A1 * | 5/2012 | Parker, II | G06Q 30/0222 701/426 |
| 2017/0199710 A1 * | 7/2017 | Ando | G06F 3/1267 |

FOREIGN PATENT DOCUMENTS

JP 2009-303008 A 12/2009

* cited by examiner

*Primary Examiner* — Tammy Paige Goddard
*Assistant Examiner* — Darryl V Dottin
(74) *Attorney, Agent, or Firm* — Foley & Lardner LLP

(57) ABSTRACT

According to one embodiment, an information processing apparatus includes a storage unit and a control unit. The storage unit stores in advance first identification information out of the first identification information and second identification information which are associated with the same user. The control unit acquires data of a job associated with the second identification information. The control unit suspends the execution of the job when the second identification information is not associated with the first identification information. The control unit authenticates the user using the first identification information. The control unit associates the second identification information with the first identification information when an operation determined in advance is received.

10 Claims, 13 Drawing Sheets

| USER ACCOUNT | PASSWORD | GROUP ASSIGNMENT | AUTHORITY ASSIGNMENT | NUMBER OF PRINTED COPIES (COLOR) | NUMBER OF PRINTED COPIES (MONOCHROME) |
|---|---|---|---|---|---|
| admin | admin | group1, group2 | Administrator | 12 | 30 |
| user11 | 123456 | group1 | User | 31 | 66 |
| user12 | abcdefg | group1 | User | 2 | 8 |
| user21 | ok_printer | group2 | User | 5 | 9 |
| user22 | hi_mfp | group2 | User | 0 | 0 |

| USER ACCOUNT | CLOUD ACCOUNT |
|---|---|
| admin | |
| user11 | |
| user12 | |
| user21 | h02@mail.com |
| user22 | |

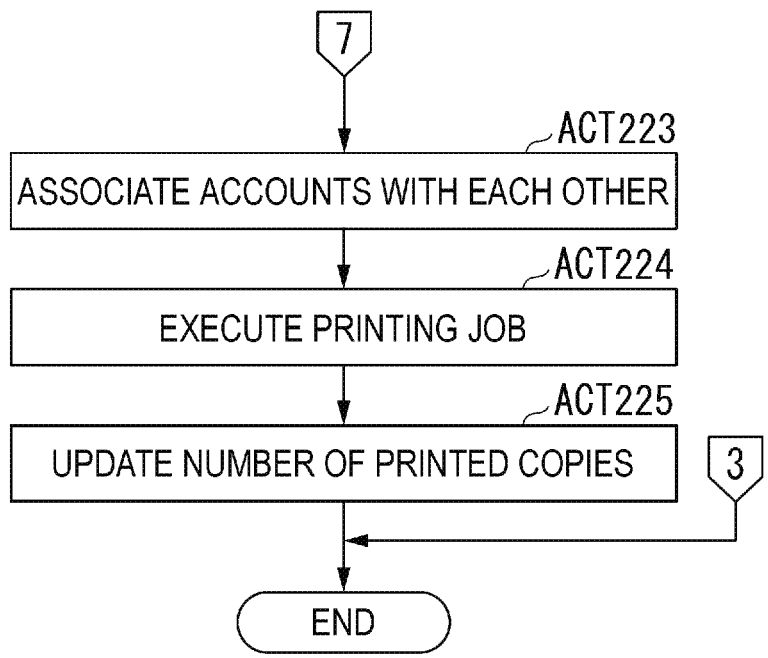

| USER ACCOUNT | CLOUD ACCOUNT |
|---|---|
| admin | |
| user11 | |
| user12 | |
| user21 | h02@mail.com |
| user22 | a03@mail.com |

FIG. 20

| USER ACCOUNT | PASSWORD | GROUP ASSIGNMENT | AUTHORITY ASSIGNMENT | NUMBER OF PRINTED COPIES (COLOR) | NUMBER OF PRINTED COPIES (MONOCHROME) |
|---|---|---|---|---|---|
| admin | admin | group1, group2 | Administrator | 12 | 30 |
| user11 | 123456 | group1 | User | 31 | 66 |
| user12 | abcdefg | group1 | User | 2 | 8 |
| user21 | ok_pos | group2 | User | 5 | 9 |
| user22 | hi_pos | group2 | User | 1 | 1 |

FIG. 21

| USER ACCOUNT | SETTLEMENT INFORMATION |
|---|---|
| admin | CREDIT CARD NUMBER |
| user11 | MOBILE SETTLEMENT NUMBER |
| user12 | ELECTRONIC MONEY NUMBER |
| user21 | CREDIT CARD NUMBER |
| user22 | |

FIG. 22

| USER ACCOUNT | SETTLEMENT INFORMATION |
|---|---|
| admin | CREDIT CARD NUMBER |
| user11 | MOBILE SETTLEMENT NUMBER |
| user12 | ELECTRONIC MONEY NUMBER |
| user21 | CREDIT CARD NUMBER |
| user22 | CREDIT CARD NUMBER |

# INFORMATION PROCESSING APPARATUS, INFORMATION PROCESSING METHOD AND NON-TRANSITORY RECORDING MEDIUM

FIELD

Embodiments described herein relate generally to an information processing apparatus, an information processing method and a non-transitory recording medium.

BACKGROUND

An image forming apparatus registered in a server providing a cloud service may be shared by a plurality of users. The image forming apparatus acquires data of a printing job from the server. The image forming apparatus executes the printing job. The image forming apparatus manages the number of printed copies for each user of the image forming apparatus. The image forming apparatus charges a user of the image forming apparatus in accordance with the number of printed copies. However, the image forming apparatus does not manage the association between identification information of a user of the server and identification information of a user of the image forming apparatus. For this reason, the image forming apparatus cannot charge the same user of the image forming apparatus in accordance with the number of printed copies of the user of the server even when the user of the server and the user of the image forming apparatus are identical.

The above-described problem that arises in association with a plurality of pieces of identification information is not limited to charging based on the number of printed copies and is a problem when only one of the different pieces of identification information associated with the same user is used by the information processing apparatus. In this manner, when first identification information out of the first identification information and second identification information which are associated with the same user is used by an information processing apparatus and the second identification information is not used by the same information processing apparatus, the first identification information and the second identification information cannot be associated with each other.

DESCRIPTION OF THE DRAWINGS

FIG. 12 is a flowchart showing an example of a sixth portion of the association procedure;

FIG. 13 is a diagram showing an example of the display of a list of suspended jobs;

FIG. 20 is a diagram showing an example of a user information management table;

FIG. 21 is a diagram showing a first example of a settlement information management table; and FIG. 22 is a diagram showing a second example of the settlement information management table.

DETAILED DESCRIPTION

In general, according to one embodiment, an information processing apparatus includes a storage unit and a control unit. The storage unit is configured to store in advance first identification information, associated with a user, out of the first identification information and second identification information. The control unit is configured to acquire data of a job associated with the second identification information. The control unit is configured to suspend execution of the job in response to determining that the second identification information is not associated with the first identification information. The control unit is configured to authenticates the user using the first identification information. The control unit is configured to associate the second identification information with the first identification information when a predetermined operation occurs.

Hereinafter, an information processing apparatus, an information processing method and a non-transitory recording medium according to embodiments will be described with reference to the accompanying drawings.

First Embodiment

Figure 1:
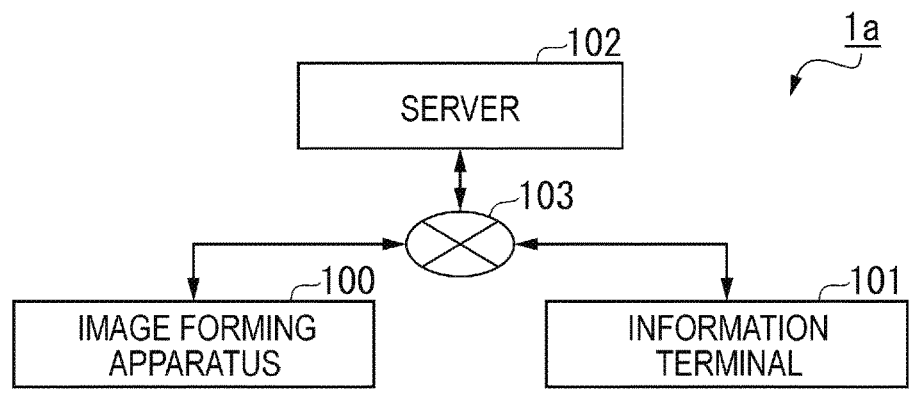
FIG. 1 is a block diagram showing a configuration example of an information processing system according to a first embodiment.

FIG. 1 is a block diagram showing a configuration example of an information processing system 1a according to a first embodiment. The information processing system 1a includes an image forming apparatus 100, an information terminal 101 and a server 102. A user of the image forming apparatus 100 and a user of the information terminal 101 are identical. The user of the information terminal 101 becomes the user of the server 102 by logging in to the server 102.

The information processing system 1a is a system that executes a printing job (printing process) on the image forming apparatus based on data of a printing job transmitted from the information terminal to the server. The image forming apparatus 100 is an information processing apparatus and is, for example, a multi-function printer (MFP). The information terminal 101 is an information processing apparatus and is, for example, a personal computer, a smartphone terminal or a tablet terminal. The server 102 is an information processing apparatus and is, for example, a cloud server. For example, the server 102 provides a service (remote printing service) fora remote image forming apparatus to print data of a printing job as a cloud service.

The information terminal 101 communicates with the server 102 through a network 103. The information terminal 101 logs in to the server 102 with an account registered in the server 102 (hereinafter, referred to as a "cloud account") in accordance with an operation of the user of the information terminal 101. The information terminal 101 selects the image forming apparatus 100 registered in the server 102. The information terminal 101 registers data of a printing job in the server 102.

The information terminal 101 may acquire a personal identification number (PIN) code in response to an operation of the user of the information terminal 101. For example, the PIN code (personal authentication code) is expressed by a four-digit number. The information terminal 101 may transmit the number of printing copies, a PIN code, and a printing mode (both sides, one side) to the server 102 as a printing option. The server 102 notifies the selected image forming apparatus 100 that data of a printing job is registered, through the network 103.

The image forming apparatus 100 stores in advance an account of a user of an image forming apparatus (hereinafter, a "user account"). For example, the user account is used to manage the number of printed copies for each user of the image forming apparatus 100. Information on the number of printed copies is used for charging each user of the image forming apparatus 100.

The image forming apparatus 100 stores a data table (hereinafter, a "cloud account management table") showing the association between a user account and a cloud account. The image forming apparatus 100 stores a data table (hereinafter, referred to as a "user information management table") showing a charging target for each user account. For example, the charging target is the number of printed copies.

The image forming apparatus 100 acquires data of a printing job and a cloud account from the server 102. The image forming apparatus 100 may acquire a PIN code from the server 102 as a printing option of the data of the printing job. The image forming apparatus 100 retrieves the cloud account acquired from the server 102 in the cloud account management table. When the acquired cloud account is not registered in the cloud account management table, the image forming apparatus 100 suspends the execution of the printing job.

The image forming apparatus 100 authenticates the user of the image forming apparatus 100 using a user account registered in the user information management table. When the image forming apparatus 100 receives an operation determined in advance, the image forming apparatus associates a cloud account with the user account of the authenticated user by registering the cloud account in the cloud account management table.

For example, the operation determined in advance is an operation of the user of the image forming apparatus 100 inputting a cloud account to the image forming apparatus 100. The operation determined in advance may be an operation of the user of the image forming apparatus 100 inputting a PIN code or a cloud account to the image forming apparatus 100, or an operation of the user of the image forming apparatus 100 selecting a cloud account.

When the acquired cloud account is registered in the cloud account management table, the image forming apparatus 100 executes a printing job of the registered cloud account. The image forming apparatus 100 can charge a user of a user account associated with a cloud account in accordance with the number of printed copies of a printing job acquired from the server 102.

Figure 2:
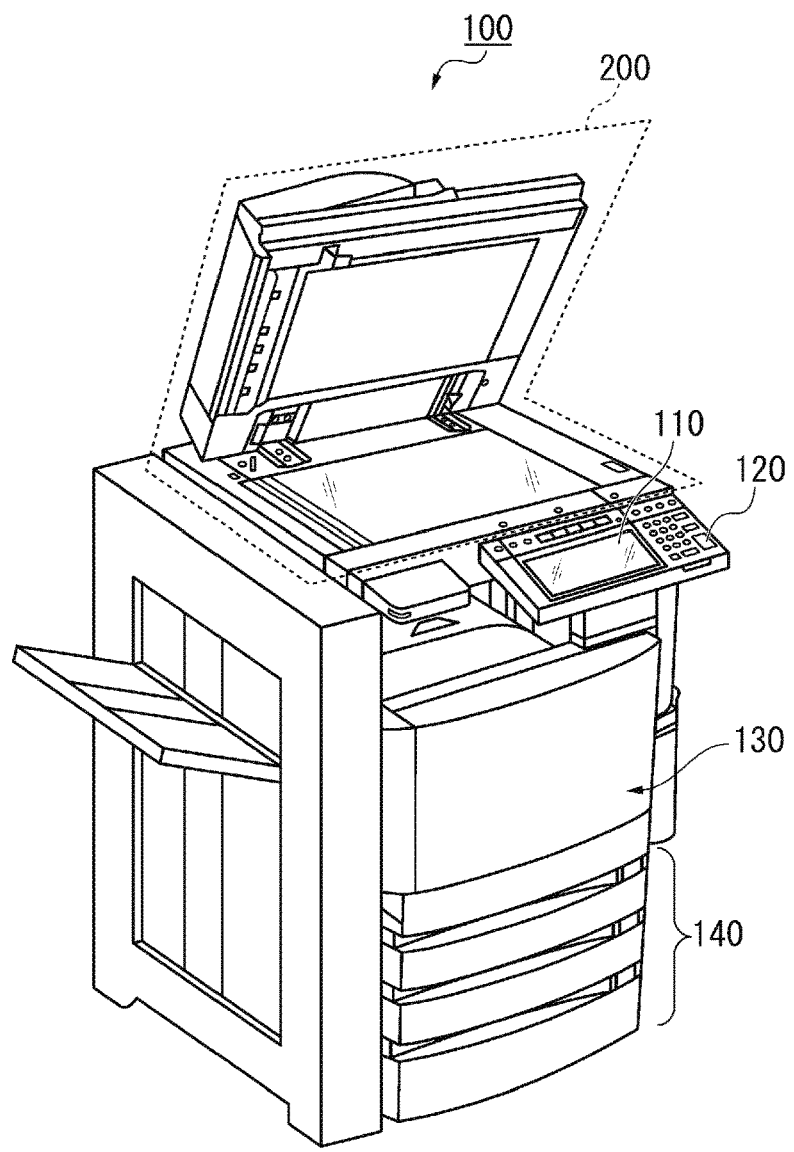
FIG. 2 is an exterior diagram showing an overall configuration example of an image forming apparatus.

FIG. 2 is an exterior diagram showing an overall configuration example of the image forming apparatus 100 according to the embodiment. The image forming apparatus 100 is, for example, a multi-function printer. The image forming apparatus 100 includes a display 110, a control panel 120, a printer 130, a sheet accommodation portion 140, and an image reading unit 200.

The image forming apparatus 100 forms an image on a sheet using a developer such as a toner. The sheet is, for example, paper or label paper. The sheet may be anything as long as the image forming apparatus 100 can form an image on the surface thereof. The image forming apparatus 100 may be an image forming apparatus that fixes a toner image or may be an ink jet type image forming apparatus.

The display 110 is an image display apparatus such as a liquid crystal display or an organic electroluminescence (EL) display. The display 110 displays various pieces of information on the image forming apparatus 100.

The control panel 120 includes a plurality of buttons. The control panel 120 receives a user's operation. The control panel 120 outputs a signal corresponding to an operation performed by the user to a control unit of the image forming apparatus 100. Meanwhile, the display 110 and the control panel 120 may be configured as an integrated touch panel.

The printer 130 is an apparatus that forms an image on a sheet using a developer and fixes the formed image onto the sheet. The printer 130 forms an image on a sheet based on image information generated by the image reading unit 200 or image information received through a communication channel.

The printer 130 forms an image through, for example, the following process. An image forming unit of the printer 130 forms an electrostatic latent image on a photosensitive drum based on image information. The image forming unit of the printer 130 forms a visible image by attaching a developer to the electrostatic latent image. A specific example of the developer is a toner. A transfer unit of the printer 130 transfers the visible image on a sheet. A fixing unit of the printer 130 fixes the visible image onto the sheet by heating and pressurizing the sheet. Meanwhile, the sheet having the image formed thereon may be a sheet accommodated in the sheet accommodation unit 140 or may be a manually inserted sheet.

The sheet accommodation unit 140 accommodates sheets to be used for image formation in the printer 130.

The image reading unit 200 reads image information, which is a reading target, depending on the brightness and darkness of light. The image reading unit 200 records the read image information. The recorded image information may be transmitted to another information processing apparatus through a network. The recorded image information may be formed as an image on a sheet by the printer 130.

Figures 3, 4:
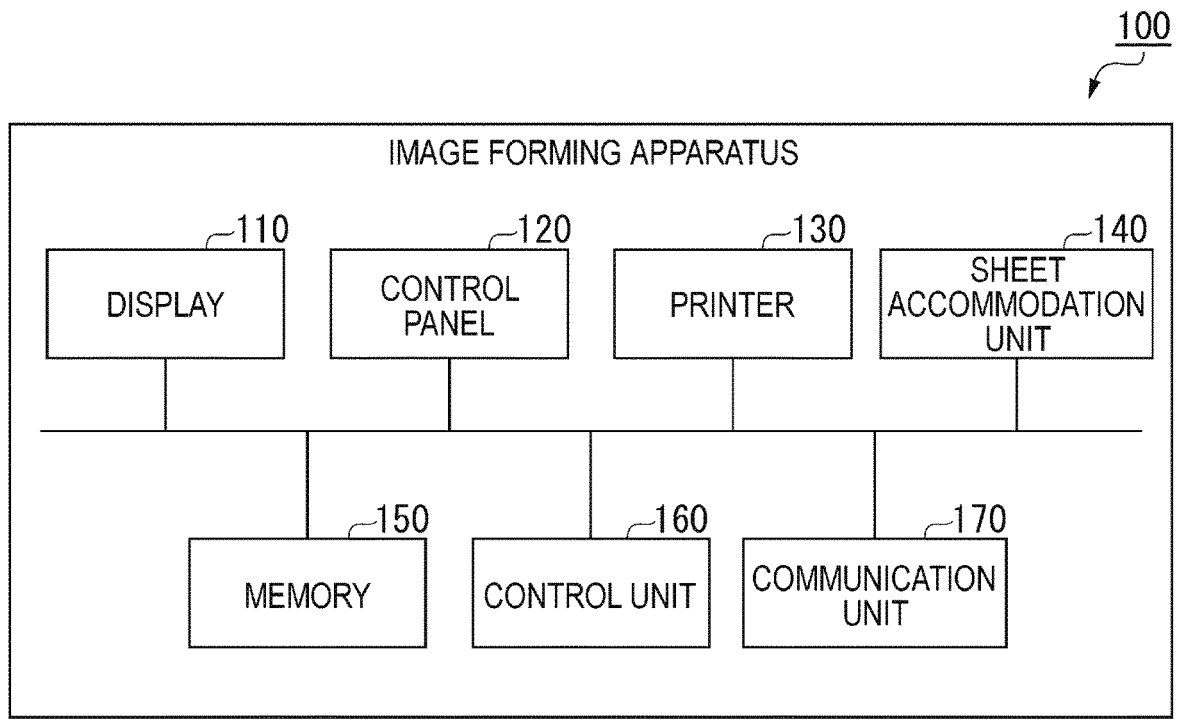
FIG. 3 is a block diagram showing a configuration example of the image forming apparatus.
FIG. 4 is a diagram showing an example of a user information management table.

FIG. 3 is a block diagram showing a configuration example of the image forming apparatus 100 according to the embodiment. The image forming apparatus 100 includes the display 110, the control panel 120, the printer 130, the sheet accommodation unit 140, a memory 150, a control unit 160, and a communication unit 170.

The memory 150 is a non-volatile recording medium (non-transitory recording medium) such as a flash memory. For example, the memory 150 stores a program for associating a plurality of pieces of identification information with each other. The memory 150 acquires a cloud account management table and a user information management table. The memory 150 stores the cloud account management table and the user information management table. The memory 150 stores a driving program of the printer 130. The memory 150 may include a volatile recording medium such as a dynamic random access memory (DRAM).

A portion or the entirety of the control unit 160 is realized as software by a processor such as a central processing unit (CPU) executing a program stored in the memory 150. The program may be recorded in a computer-readable recording medium. The computer-readable recording medium is a portable medium such as a flexible disk, a magneto-optical disk, a read only memory (ROM) or a compact disc read only memory (CD-ROM), or a non-transitory recording medium such as a hard disk embedded in a computer system. The program may be transmitted through an electric communication line.

A portion or the entirety of the control unit 160 may be realized using hardware including an electronic circuit or circuitry using, for example, a large scale integration circuit (LSI), an application specific integrated circuit (ASIC), a programmable logic device (PLD), a field programmable gate array (FPGA) or the like.

The communication unit 170 executes communication with the server 102. The communication unit 170 acquires data of a printing job and a cloud account from the server 102. The data of the printing job may include a file name of a printing target. The communication unit 170 may acquire data of a printing option from the server 102.

FIG. 4 is a diagram showing an example of the user information management table according to the first embodiment. In the user information management table, a user account, a password, group assignment, authority assignment, the number of printed copies (color), and the number of printed copies (monochrome) are associated with each other. The authority refers to the authority to change data in a data table recorded in the image forming apparatus 100. For example, when an administrator of the image forming apparatus 100 logs in to the image forming apparatus 100 with a user account "admin", the administrator may change "group assignment" or the like in the user information management table.

Figures 5, 6:
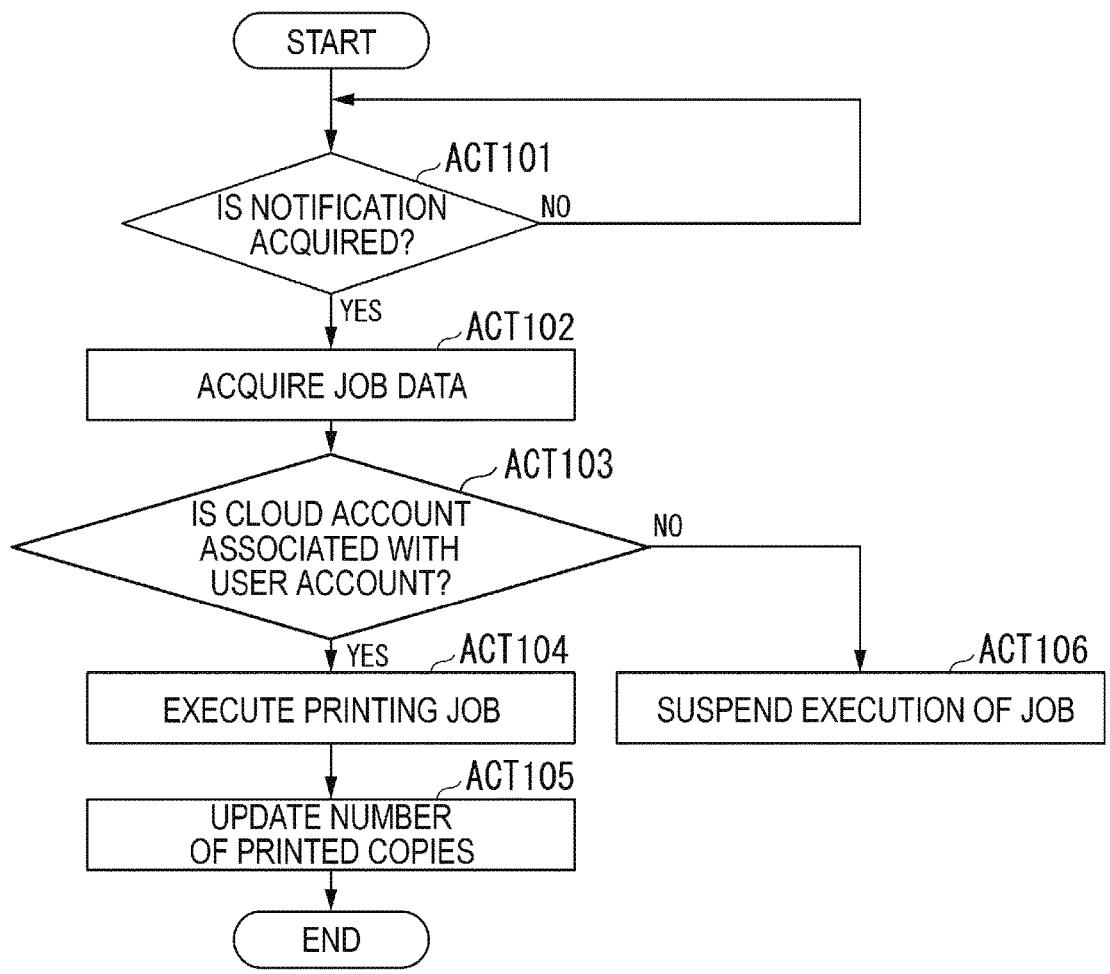
FIG. 5 is a diagram showing a first example of a cloud account management table.
FIG. 6 is a flowchart showing an example of a printing procedure.
Figure 7:
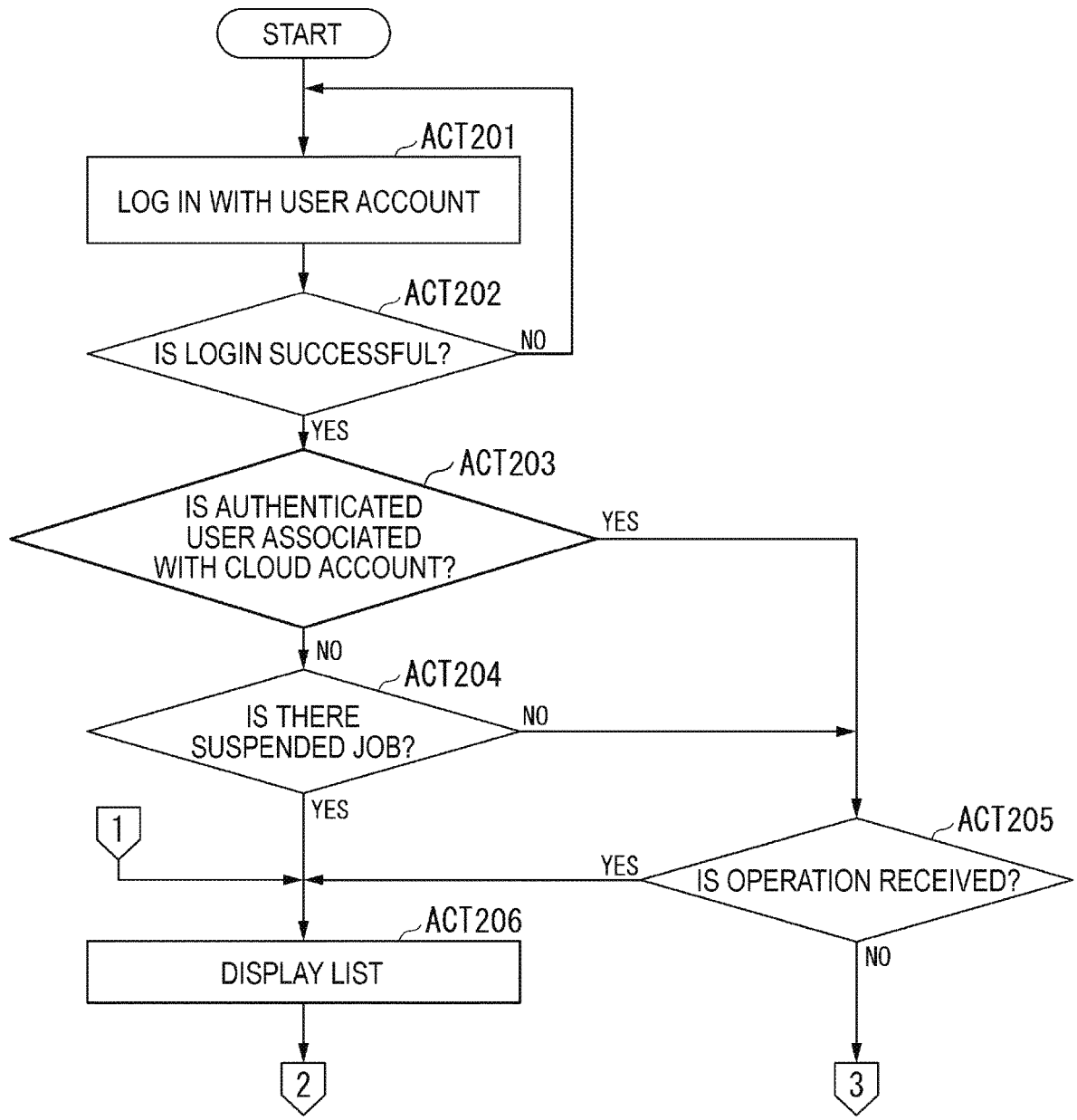
FIG. 7 is a flowchart showing an example of a first portion of an association procedure.
Figure 8:
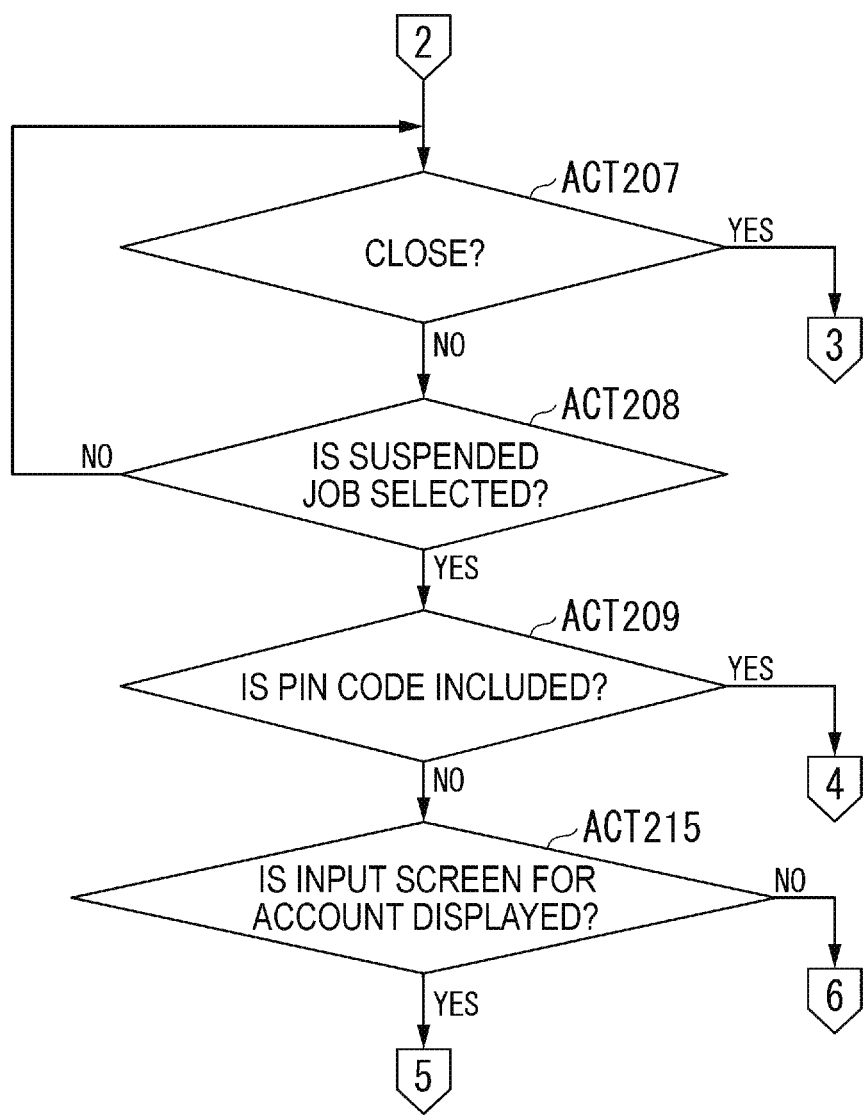
FIG. 8 is a flowchart showing an example of a second portion of the association procedure.
Figure 9:
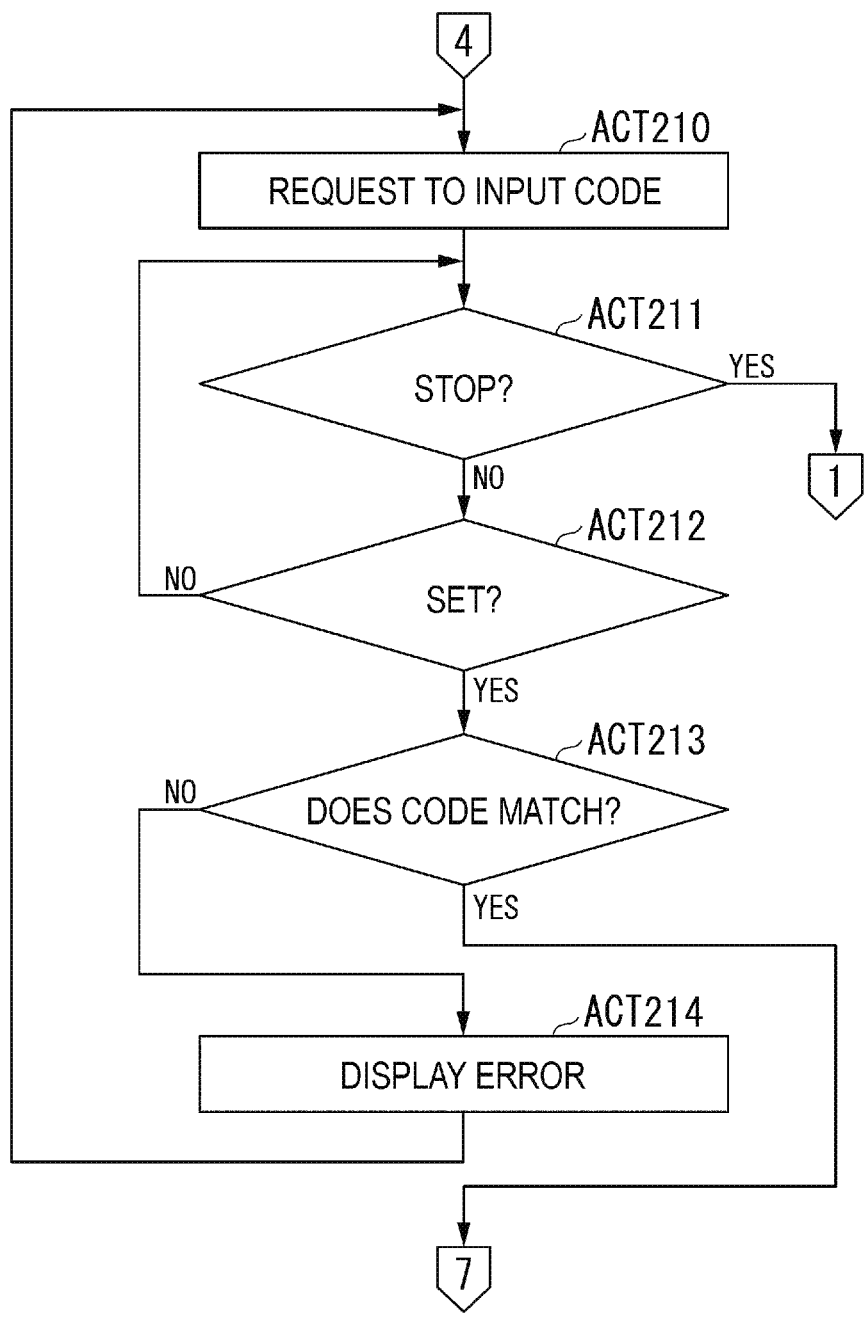
FIG. 9 is a flowchart showing an example of a third portion of the association procedure.
Figure 10:
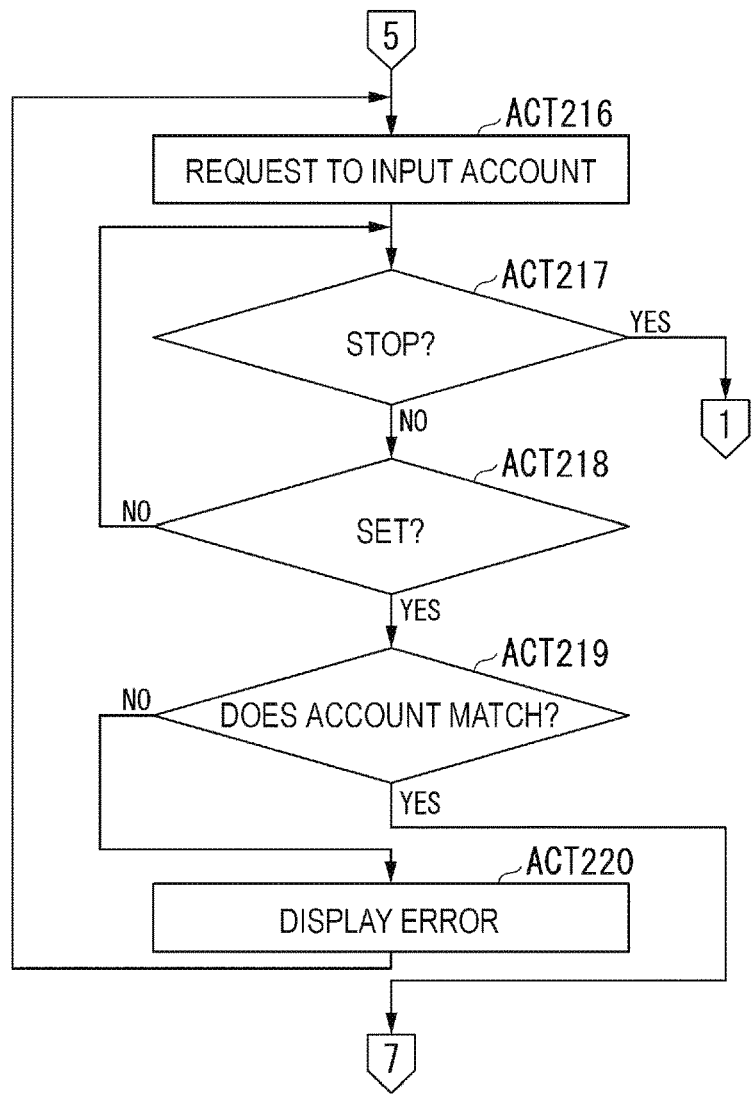
FIG. 10 is a flowchart showing an example of a fourth portion of the association procedure.
Figure 11:
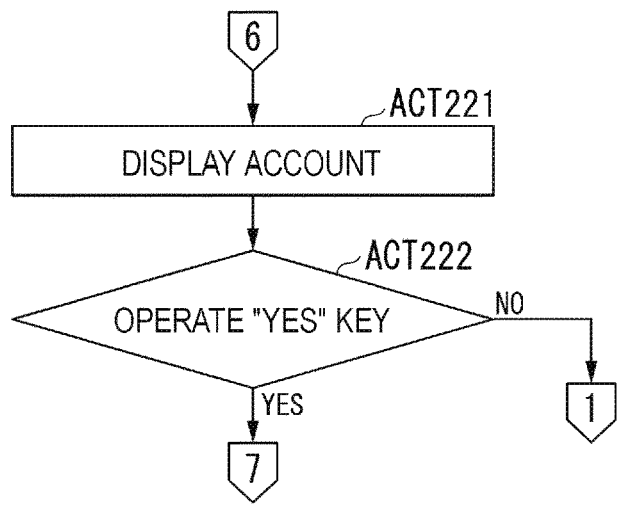
FIG. 11 is a flowchart showing an example of a fifth portion of the association procedure.

FIG. 5 is a diagram showing a first example of the cloud account management table according to the first embodiment. In the cloud account management table, a user account and a cloud account are associated with each other. In FIG. 5, there is no cloud account associated with a user account "user22".

Next, a method of associating a plurality of pieces of identification information will be described.

FIG. 6 is a flowchart showing an example of a printing procedure according to the first embodiment. When the server 102 acquires data of a printing job from the information terminal 101, the server notifies the image forming apparatus 100 that the printing job is registered. The control unit 160 determines whether or not a notification is acquired (ACT101).

When a notification is not acquired (ACT101: NO), the control unit 160 executes the operation of ACT101 at a predetermined cycle. When a notification is acquired (ACT101: YES), the control unit 160 acquires data of a printing job and a cloud account from the server 102 (ACT102).

The control unit 160 determines whether or not the acquired cloud account is associated with the user account in the cloud account management table (ACT103). When the acquired cloud account is associated with the user account (ACT103: YES), the control unit 160 executes the printing job based on the acquired data of the printing job (ACT104). The control unit 160 updates the number of printed copies in the user information management table with respect to the user account associated with the acquired cloud account (ACT105).

When the acquired cloud account is not associated with the user account (ACT103: NO), the control unit 160 suspends the execution of the printing job based on the acquired data of the printing job. For example, the control unit 160 records, in the memory 150, the data of the printing job of which the execution is suspended as a suspended job (ACT106). In order for data of the suspended job to be printed, a cloud account of the suspended job is required to be associated with the user account.

FIGS. 7 to 12 are flowcharts showing an example of an association procedure according to the first embodiment. The user of the image forming apparatus 100 operates an operation key of the control panel 120 or an operation key displayed on the display 110. The control unit 160 authenticates the user of the image forming apparatus 100 based on an operation of logging in to the image forming apparatus 100 with a user account (ACT201).

The control unit 160 determines whether or not the login is successful based on the user account and the user information management table (ACT202). When the login is failed (ACT202: NO), the control unit 160 returns the process to the operation of ACT201. When the login is successful (ACT202: YES), the control unit 160 determines whether or not the user account of the authenticated user is associated with a cloud account in the cloud account management table (ACT203).

When the user account is associated with the cloud account (ACT203: YES), the control unit 160 displays a predetermined normal menu on the display 110. The control unit 160 causes the process to proceed to ACT205.

When the user account is not associated with the cloud account (ACT203: NO), the control unit 160 determines whether or not suspended jobs are stored in the memory 150 (ACT204). When suspended jobs are not stored in the memory 150 (ACT204: NO), the control unit 160 displays a predetermined normal menu on the display 110. The control unit 160 causes the process to proceed to ACT205.

The control unit 160 determines whether or not the control panel 120 or the display 110 receives an operation of displaying a list of suspended jobs on the display 110 (ACT205). When the control panel 120 or the display 110 does not receive an operation of displaying a list of suspended jobs on the display 110 (ACT205: NO), the control unit 160 terminates operations shown in the respective flowcharts in FIGS. 7 to 12.

When the control panel 120 or the display 110 receives an operation of displaying a list of suspended jobs displayed on the display 110 (ACT205: YES), the control unit 160 causes the process to proceed to ACT206.

When suspended jobs are stored in the memory 150 (ACT204: YES), the control unit 160 extracts one or more suspended jobs from the memory 150. The control unit 160 presents the extracted jobs to the authenticated user. For example, the control unit 160 displays a list of the suspended jobs on the display 110 (ACT206).

FIG. 13 is a diagram showing an example of the display of a list of suspended jobs according to the first embodiment. For example, the control unit 160 displays a list of suspended jobs on the display 110 in the form of a table. The control unit 160 displays an operation key "close" on the display 110.

The control unit 160 determines whether or not the operation key "close" is operated (ACT207). When the operation key "close" is operated (ACT207: YES), the control unit 160 displays a predetermined normal menu on the display 110. The control unit 160 terminates the operations shown in the respective flowcharts of FIGS. 7 to 12.

When the operation key "close" is not operated (ACT207: NO), the control unit 160 determines whether or not the control panel 120 or the display 110 receives an operation of selecting a suspended job (ACT208). When both the control panel 120 and the display 110 do not receive an operation of selecting a suspended job (ACT208: NO), the control unit 160 returns the process to ACT207.

When the control panel 120 or the display 110 receives an operation of selecting a suspended job (ACT208: YES), the control unit 160 determines whether or not a PIN code is included in a printing option of data of a printing job (ACT209). When a PIN code is included in the printing option of the data of the printing job (ACT209: YES), the control unit 160 requests the user of the image forming apparatus 100 to input the PIN code. For example, the control unit 160 displays an input screen for the PIN code on the display 110 (ACT210).

Figure 14:
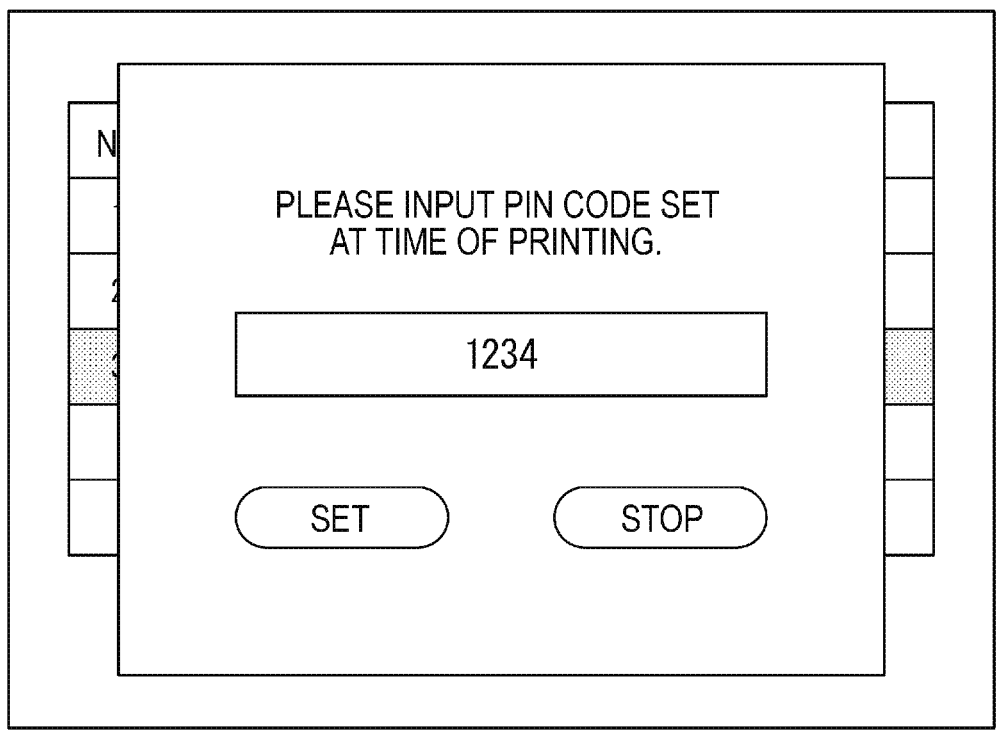
FIG. 14 is a diagram showing an example of a PIN code input screen.

FIG. 14 is a diagram showing an example of a PIN code input screen according to the first embodiment. The display 110 displays the PIN code input screen. The PIN code input screen includes an operation key "set" and an operation key "stop". For example, the user inputs the PIN code to the control unit 160 by operating an operation key "set" of the display 110.

The control unit 160 determines whether or not the operation key "stop" is operated (ACT211). When the operation key "stop" is operated (ACT211: YES), the control unit 160 returns the process to ACT206. When the operation key "stop" is not operated (ACT211: NO), the control unit 160 determines whether or not the operation key "set" is operated (ACT212). When the operation key "set" is not operated (ACT212: NO), the control unit 160 returns the process to ACT211. When the operation key "set" is operated (ACT212: YES), the control unit 160 determines whether or not the input PIN code matches the PIN code of the printing option (ACT213).

When the input PIN code matches the PIN code of the printing option (ACT213: YES), the control unit 160 causes the process to proceed to ACT223. When the input PIN code and the PIN code of the printing option are different (ACT213: NO), the control unit 160 displays information such as characters indicating an error on the display 110. Accordingly, the control unit 160 can prompt the user of the image forming apparatus 100 to input the PIN code again (ACT214). The control unit 160 returns the process to ACT210.

When a PIN code is not included in the printing option of the data of the printing job (ACT209: NO), the control unit 160 determines whether or not to cause the user to input a cloud account. For example, the control unit 160 determines whether or not to display a cloud account input screen on the display 110. Whether to cause the user to input or confirm the cloud account is determined in advance. For example, flag data indicating whether to cause the user to input the cloud account may be stored in the memory 150 in advance (ACT215).

When the control unit 160 determines to cause the user to input the cloud account (ACT215: YES), the control unit 160 requests the user to input the cloud account. For example, the control unit 160 displays a cloud account input screen on the display 110 (ACT216).

Figure 15:
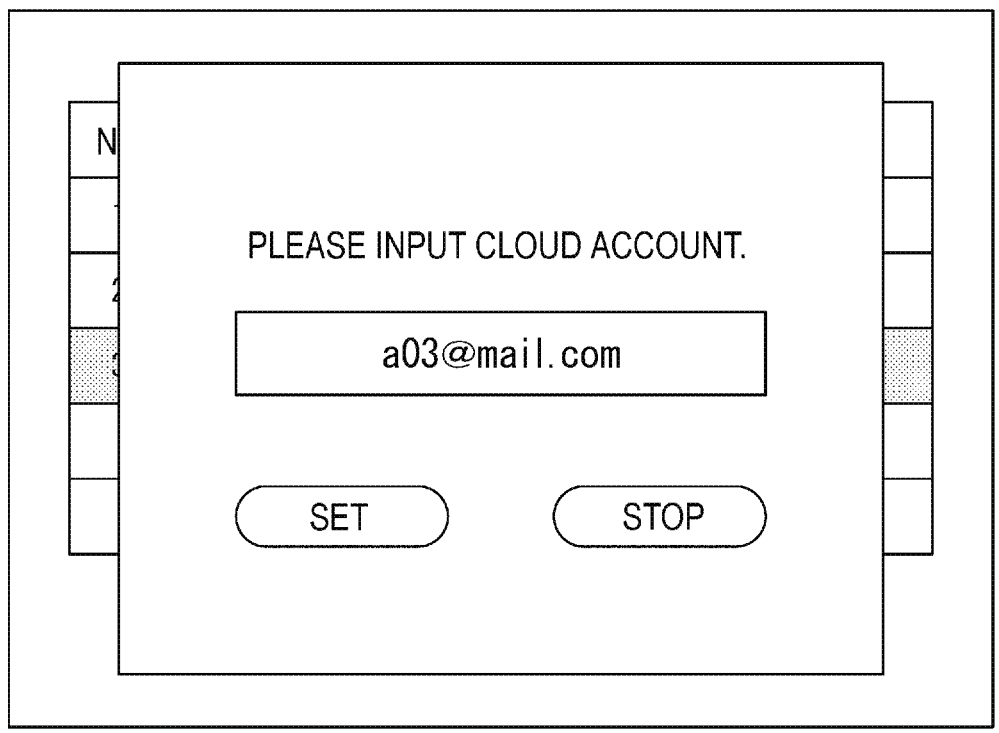
FIG. 15 is a diagram showing an example of a cloud account input screen.

FIG. 15 is a diagram showing an example of a cloud account input screen according to the first embodiment. In FIG. 15, the cloud account input screen includes a character string "please input a cloud account" for promoting an input, an input region for a cloud account, an operation key "set", and an operation key "stop". The user of the image forming apparatus 100 writes a cloud account used when the user logs in to the server 102 in the cloud account input region by operating the control panel 120 or the like. The control unit 160 acquires the cloud account written in the cloud account input region.

The control unit 160 determines whether or not the operation key "stop" is operated (ACT217). When the operation key "stop" is operated (ACT217: YES), the control unit 160 returns the process to ACT206. When the operation key "stop" is not operated (ACT217: NO), the control unit 160 determines whether or not the operation key "set" is operated (ACT218). When the operation key "set" is not operated (ACT218: NO), the control unit 160 returns the process to ACT211. When the operation key "set" is operated (ACT218: YES), the control unit 160 determines whether or not the input cloud account matches the cloud account of the printing job (ACT219).

When the input cloud account matches the cloud account of the printing job (ACT219: YES), the control unit 160 causes the process to proceed to ACT223. When the input cloud account and the cloud account of the printing job are different (ACT219: NO), the control unit 160 displays information such as a character string indicating an error on the display 110. Accordingly, the control unit 160 can prompt the user of the image forming apparatus 100 to input the cloud account again (ACT220). The control unit 160 returns the process to ACT216.

When the control unit 160 determines to cause the user to confirm the cloud account (ACT215: NO), the control unit 160 causes the user to confirm whether or not a cloud account associated with the selected printing job is an account of the user himself or herself. For example, the control unit 160 displays a screen for confirmation of the cloud account of the selected printing job on the display 110 (ACT221).

Figures 16, 17:
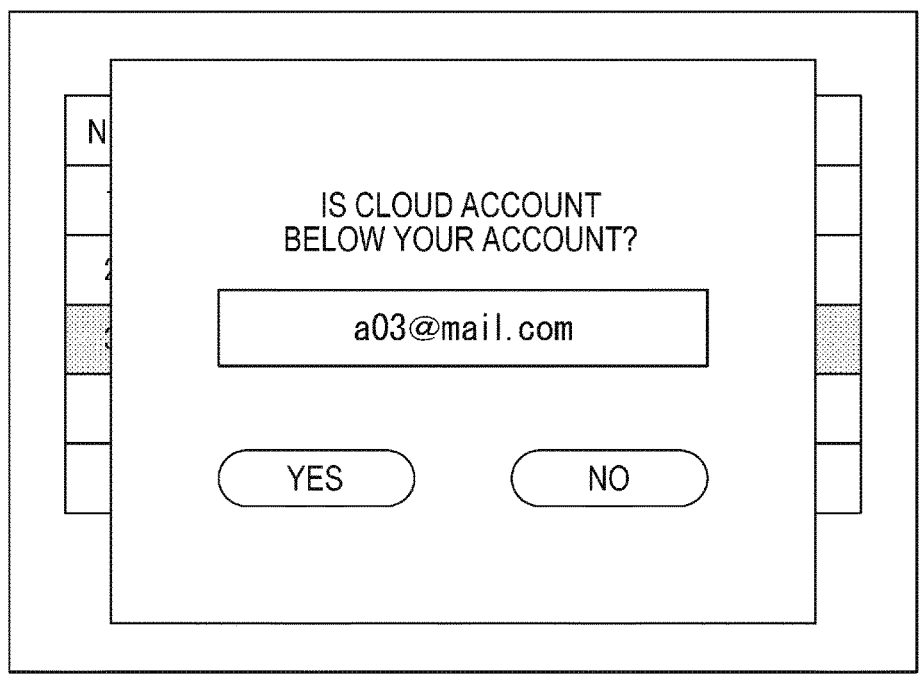
FIG. 16 is a diagram showing an example of a screen for confirmation of the cloud account.
FIG. 17 is a diagram showing a second example of the cloud account management table.

FIG. 16 is a diagram showing an example of the screen for confirmation of the cloud account according to the first embodiment. The screen for confirmation of the cloud account includes a character string for prompting an input "is the cloud account below your account?", a cloud account display region, an operation key "YES", and an operation key "NO". The cloud account of the selected printing job is displayed in the cloud account display region.

The user of the image forming apparatus 100 confirms whether or not the cloud account used when the user himself or herself logs in to the server 102 is displayed. That is, the user of the image forming apparatus 100 determines whether or not the displayed cloud account is a cloud account of the user himself or herself. When the displayed cloud account is a cloud account of the user himself or herself, the user of the image forming apparatus 100 operates the operation key "YES". When the displayed cloud account is not a cloud account of the user himself or herself, the user of the image forming apparatus 100 operates the operation key "NO".

The control unit 160 determines whether or not the operation key "YES" is operated (ACT222). When the operation key "NO" is operated (ACT222: NO), the control unit 160 returns the process to ACT206.

When the operation key "YES" is operated (ACT222: YES), the control unit 160 registers a cloud account added to the data of the printing job in the cloud account management table in association with the user account of the authenticated user (ACT223).

FIG. 17 is a diagram showing a second example of the cloud account management table according to the first embodiment. In FIG. 17, a cloud account "a03@mail.com" is associated with a user account "user22". Thus, the control unit 160 can charge the user of the user account "user22" in accordance with the number of printed copies of a printing job of the cloud account "a03@mail.com".

Since a cloud account is registered in the cloud account management table through an operation determined in advance, the control unit 160 cancels the suspension of a printing job associated with the registered cloud account. That is, the control unit 160 executes the suspended printing job (printing process) based on an operation determined in advance (ACT224). The control unit 160 updates the number of printed copies of the user account associated with the cloud account of the executed printing job in the user information management table (ACT225).

As described above, the image forming apparatus 100 (information processing apparatus) according to the first embodiment includes the memory 150 and the control unit 160. The memory 150 stores in advance first identification information out of the first identification information and second identification information which are associated with the same user. For example, the first identification information is a user account. For example, the second identification information is a cloud account. The control unit 160 acquires data of a job associated with the second identification information. For example, the data of the job is data of a printing job. When the second identification information is not associated with the first identification information, the control unit 160 suspends the execution of the job. The control unit 160 authenticates a user using the first identification information. When the control unit 160 receives an operation determined in advance, the control unit 160 associates the second identification information with the first identification information.

Accordingly, when first identification information out of the first identification information and second identification information which are associated with the same user is used by an information processing apparatus and the second identification information is not used by the same information processing apparatus, the first identification information and the second identification information can be associated with each other. The image forming apparatus 100 can charge a user of a user account associated with a cloud account in accordance with the number of printed copies of a printing job acquired from the server 102.

When an operation key determined in advance is operated in a state where a predetermined normal menu is displayed on the display 110, the control unit 160 may display a list of suspended jobs as shown in FIG. 13 on the display 110. The control unit 160 may associate a plurality of cloud accounts with each user account in the cloud account management table.

A job registered in the server 102 by the information terminal 101 may not be limited to a printing job. The information terminal 101 may register data of jobs of various processes with which the image forming apparatus 100 copes, in the server 102. For example, the information terminal 101 may register data of a job of a scanning operation, in the server 102.

The control unit 160 may present the cloud account management table to an administrator by displaying the cloud account management table on the display 110. The control unit 160 may update the cloud account management table in response to the administrator's operation. The control unit 160 may update a cloud account of a user other than the administrator in the cloud account management table in response to the user's operation.

Second Embodiment

A second embodiment is different from the first embodiment in that an information processing apparatus is a checkout apparatus (point of sale (POS) terminal). In the second embodiment, differences from the first embodiment will be described.

Figure 18:
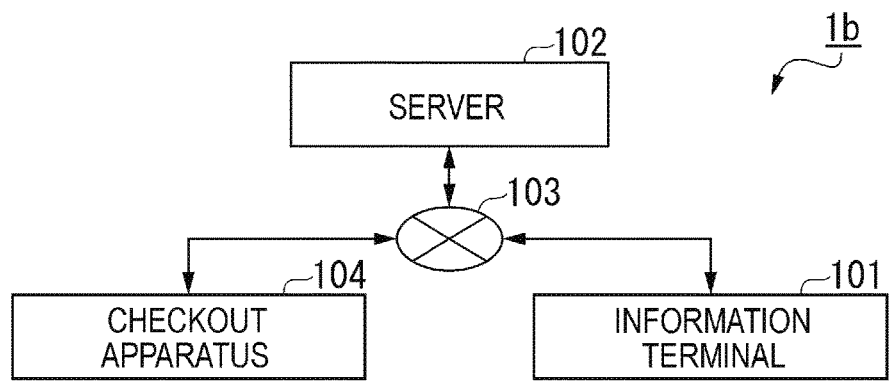
FIG. 18 is a block diagram showing a configuration example of an information processing system.

FIG. 18 is a block diagram showing a configuration example of an information processing system 1b according to the second embodiment. The information processing system 1b includes an information terminal 101, a server 102, and a checkout apparatus 104. The information processing system 1b includes the checkout apparatus 104 instead of the image forming apparatus 100 in the first embodiment. For example, the checkout apparatus 104 is installed in a store. The information processing system 1b is a system that executes a checkout job (checkout process) in the checkout apparatus. The checkout job is a process of executing the checkout of purchased commodities. In the checkout job, a receipt printing process may be executed.

The server 102 is an information processing apparatus and is, for example, a server for settlement. The server 102 stores settlement information for each user. The settlement information is, for example, a mobile settlement number, an electronic money number, and a credit card number. The settlement information is equivalent to a cloud account (second identification information) in the first embodiment.

The checkout apparatus 104 is an information processing apparatus and is, for example, a POS terminal. The checkout apparatus 104 may be operated by a store clerk in a store or may be operated by a customer (user) purchasing a commodity. For example, the checkout apparatus 104 reads a user account (first identification information) from the information terminal 101 of the customer purchasing the commodity.

The checkout apparatus 104 stores a data table showing the association between a user account and settlement information (hereinafter, a "settlement information management table"). The checkout apparatus 104 stores a user information management table. For example, charging on the user of the checkout apparatus 104 is executed in accordance with the number of purchased commodities.

Figure 19:
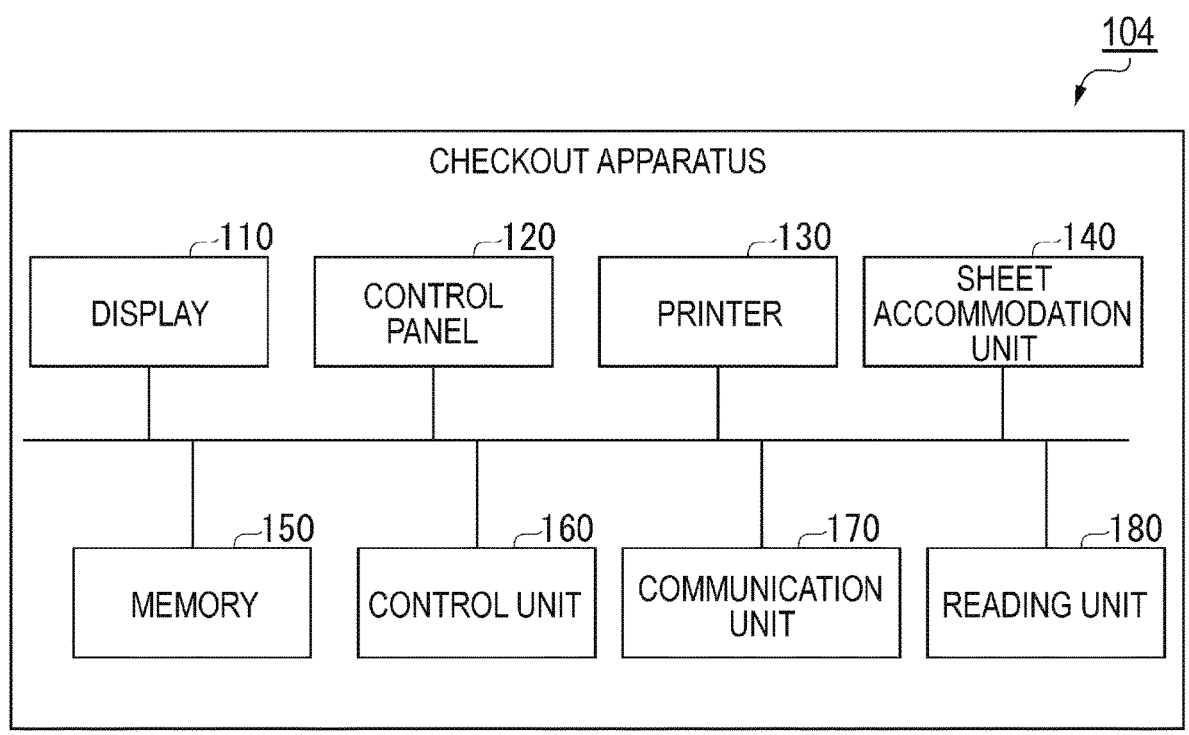
FIG. 19 is a block diagram showing a configuration example of a checkout apparatus.

FIG. 19 is a block diagram showing a configuration example of the checkout apparatus 104 according to the second embodiment. The checkout apparatus 104 includes a display 110, a control panel 120, a printer 130, a sheet accommodation unit 140, a memory 150, a control unit 160, a communication unit 170, and a reading unit 180. The memory 150 stores the settlement information management table and the user information management table.

FIG. 20 is a diagram showing an example of the user information management table according to the second embodiment. In the user information management table, a user account, a password, group assignment, authority assignment, the purchased number of first commodities, and the purchased number of second commodities are associated with each other. The purchased number of first commodities is equivalent to the number of printed copies (color) in FIG. 4. The purchased number of second commodities is equivalent to the number of printed copies (monochrome) in FIG. 4.

FIG. 21 is a diagram showing a first example of the settlement information management table according to the second embodiment. In the settlement information management table, a user account and settlement information are associated with each other. In FIG. 21, there is no settlement information associated with a user account "user22".

The reading unit 180 acquires a user account from an information terminal 101 of a customer. For example, the reading unit 180 acquires the user account by optically reading a one-dimensional code or a two-dimensional code displayed on a display of the information terminal 101. The reading unit 180 may acquire the user account from the information terminal 101 through wireless communication. The reading unit 180 may acquire the user account by optically reading a one-dimensional code or a two-dimensional code written in a card for identifying a customer.

The reading unit 180 may acquire identification information of a commodity by optically reading a one-dimensional code or a two-dimensional code imparted to a commodity. The reading unit 180 may acquire identification information of a commodity by reading information of a tag imparted to a commodity through wireless communication.

The control unit 160 authenticates a user of the checkout apparatus 104 based on an operation of the reading unit 180 logging in to the checkout apparatus 104 with the user account acquired from the information terminal 101. Similarly to an example of the display of a list of suspended jobs, the control unit 160 displays a list of pieces of suspended settlement information on the display 110. A customer selects suspended settlement information from the list of the pieces of suspended settlement information.

FIG. 22 is a diagram showing a second example of the settlement information management table according to the second embodiment. In FIG. 22, settlement information "credit card number" is associated with the user account "user22". Thus, the control unit 160 can execute a checkout job (charging) on the user of the user account "user22" in accordance with the purchased number of commodities of the checkout job of the settlement information "credit card number". The printer 130 issues a receipt based on data of the checkout job.

As described above, the checkout apparatus 104 (information processing apparatus) according to the second embodiment includes the memory 150 and the control unit 160. The memory 150 stores in advance first identification information out of the first identification information and second identification information which are associated with the same user. For example, the first identification information is a user account. For example, the second identification information is settlement information. The control unit 160 acquires data of a job associated with settlement information. For example, the data of the job is data of a checkout job. The control unit 160 suspends the execution of a job when the second identification information is not associated with the first identification information. The control unit 160 authenticates a user using the first identification information. For example, the control unit 160 authenticates a user using the first identification information read by the reading unit 180 from a card of a customer (user). When the control unit 160 receives an operation determined in advance, the control unit associates the second identification information with the first identification information.

For example, the operation determined in advance is an operation of inputting a PIN code, similar to the operation of inputting a PIN code in FIG. 14. The operation determined in advance may be an operation of inputting settlement information, similar to the operation of inputting a cloud account in FIG. 15. The operation determined in advance may be an operation of selecting settlement information, similar to the operation of selecting a cloud account in FIG. 16.

Accordingly, when first identification information out of the first identification information and second identification information which are associated with the same user is used by an information processing apparatus and the second identification information is not used by the same information processing apparatus, the first identification information and the second identification information can be associated with each other. The checkout apparatus 104 can execute a settlement process (checkout job) based on only user information by associating user information and settlement information with each other. The checkout apparatus 104 can improve user convenience.

While certain embodiments have been described, these embodiments have been presented by way of example only, and are not intended to limit the scope of the inventions. Indeed, the novel embodiments described herein may be embodied in a variety of other forms: furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An information processing apparatus comprising:
a storage unit configured to:
store in advance first identification information, associated with a user, out of the first identification information and second identification information; and
a control unit configured to:
acquire data of a job associated with the second identification information;
suspend execution of the job in response to determining that the second identification information is not associated with the first identification information;
authenticate the user using the first identification information;
associate the second identification information with the first identification information when a predetermined operation occurs;
determine that the authenticated user cancels the suspension of execution of the job when the control unit acquires the second identification information in response to an operation of the authenticated users;
present information indicating the association between the first identification information and the second identification information to an administrator; and
update the information indicating the association between the first identification information and the second identification information in response to an operation of the administrator.

2. The apparatus according to claim 1, wherein
the control unit is further configured to:
extract one or more jobs of which execution is suspended;
present the extracted jobs to the authenticated user; and
cancel the suspension of execution of the job selected by the authenticated user.

3. The apparatus according to claim 1, wherein
the control unit is further configured to:
acquire data of the job associated with the second identification information and a first code;

acquire a second code in response to an operation of the authenticated user; and determine that the authenticated user cancels the suspension of execution of the job when the first code and the second code match to each other.

4. The apparatus according to claim 1, wherein the control unit is further configured to:

suspend execution of a printing process related to the job; and execute the printing process in response to determining that the second identification information is associated with the first identification information.

5. The apparatus according to claim 1, wherein the control unit is further configured to:

suspend execution of a checkout process associated with the job; and execute the checkout process in response to determining that the second identification information is associated with the first identification information.

6. The apparatus according to claim 1, wherein the second identification information is a cloud account of a remote printing service.

7. An information processing method executed by an information processing apparatus, the method comprising:

acquiring in advance first identification information, associated with a user, out of the first identification information and second identification information;

acquiring data of a job associated with the second identification information;

suspending execution of the job in response to determining that the second identification information is not associated with the first identification information;

authenticating the user using the first identification information;

associating the second identification information with the first identification information when a predetermined operation occurs;

determining that the authenticated user cancels the suspension of execution of the job when the control unit acquires the second identification information in response to an operation of the authenticated users;

presenting information indicating the association between the first identification information and the second identification information to an administrator; and updating the information indicating the association between the first identification information and the second identification information in response to an operation of the administrator.

8. A non-transitory recording medium storing a program for causing one or more processors to perform a method comprising:

acquiring first identification information, associated with a user, out of the first identification information and second identification information;

acquiring data of a job associated with the second identification information;

suspending execution of the job in response to determining that the second identification information is not associated with the first identification information;

authenticating the user using the first identification information;

associating the second identification information with the first identification information when a predetermined operation occurs;

determining that the authenticated user cancels the suspension of execution of the job when the control unit acquires the second identification information in response to an operation of the authenticated user;

presenting information indicating the association between the first identification information and the second identification information to an administrator; and updating the information indicating the association between the first identification information and the second identification information in response to an operation of the administrator.

9. The method according to claim 8, further comprising:

extracting one or more jobs of which execution is suspended;

presenting the extracted jobs to the authenticated user; and canceling the suspension of execution of the job selected by the authenticated user.

10. The method according to claim 8, further comprising:

acquiring data of the job associated with the second identification information and a first code;

acquiring a second code in response to an operation of the authenticated user; and determining that the authenticated user cancels the suspension of execution of the job when the first code and the second code match to each other.

* * * * *